(12) United States Patent
Zhang et al.

(10) Patent No.: US 8,574,742 B2
(45) Date of Patent: Nov. 5, 2013

(54) BATTERY AND A METHOD OF MANUFACTURING A BATTERY

(75) Inventors: Xiachang Zhang, Espoo (FI); Shoujun Li, Espoo (FI)

(73) Assignee: Enfucell Oy, Vantaa (FI)

( * ) Notice: Subject to any disclaimer, the term of this patent is extended or adjusted under 35 U.S.C. 154(b) by 28 days.

(21) Appl. No.: 13/062,520

(22) PCT Filed: Sep. 4, 2009

(86) PCT No.: PCT/FI2009/000082
§ 371 (c)(1),
(2), (4) Date: Mar. 7, 2011

(87) PCT Pub. No.: WO2010/026286
PCT Pub. Date: Mar. 11, 2010

(65) Prior Publication Data
US 2011/0165447 A1 Jul. 7, 2011

(30) Foreign Application Priority Data

Sep. 8, 2008 (FI) ...................................... 20085838
Sep. 8, 2008 (FI) ...................................... 20085840

(51) Int. Cl.
*H01M 6/40* (2006.01)
(52) U.S. Cl.
USPC .......................................................... 429/124
(58) Field of Classification Search
USPC .......................................................... 429/124
See application file for complete search history.

(56) References Cited

U.S. PATENT DOCUMENTS

| | | | | |
|---|---|---|---|---|
| 5,035,965 A | * | 7/1991 | Sangyoji et al. | 429/124 |
| 2002/0055046 A1 | * | 5/2002 | Ono et al. | 429/324 |
| 2003/0099884 A1 | * | 5/2003 | Chiang et al. | 429/233 |

FOREIGN PATENT DOCUMENTS

| | | |
|---|---|---|
| EP | 1376722 | 1/2004 |
| WO | 2007135432 | 11/2007 |
| WO | WO 2007135432 A1 * | 11/2007 |
| WO | 2008096033 | 8/2008 |
| WO | WO 2008096033 A1 * | 8/2008 |

* cited by examiner

*Primary Examiner* — Ula C Ruddock
*Assistant Examiner* — Scott J Chimielecki
(74) *Attorney, Agent, or Firm* — Fasth Law Offices; Rolf Fasth (57) ABSTRACT

The printed battery has cathode and anode electrodes with terminals to connect to an external circuit, separator therebetween and electrolyte. An anode electrode material is applied on one side of the separator and a cathode electrode material on the opposite side. The anode material is dry and hydrophobic and is prepared by providing an anode active material, conductive material, solvent and a binder that are mixed to form an anode ink. The anode ink is applied on a substrate and then dried. In response to the drying, the solvent evaporates and the anode ink forms a film on the substrate. The prepared anode material is applied on the separator. An electrolyte solution is printed on the separator that has the anode material thereon. A cathode material is applied between a collector material and separator.

12 Claims, 6 Drawing Sheets

|       | Zinc | Sheet resistance | Flexibility | Hydrophobicity |
|-------|------|------------------|-------------|----------------|
| Ink A | A    | Around 65 Ω      | Broken after folding | Dry ink film not soluble, but resistance increased |
|       | B    | Around 65 Ω      | Broken after folding | Dry ink film not soluble, but resistance increased |
| Ink B | A    | Around 65 Ω      | Broken after folding | Dry ink film not soluble, but resistance increased |
|       | B    | Around 65 Ω      | Broken after folding | Dry ink film not soluble, but resistance increased |
| Ink C | A    | Around 40 Ω      | Broken after folding | Dry ink film not soluble, but resistance increased |
|       | B    | Around 40 Ω      | Broken after folding | Dry ink film not soluble, but resistance increased |
| Ink D | A    | Around 150 Ω     | After folding no change | With water no change on dry ink resistance |
|       | B    | Around 150 Ω     | After folding no change | With water no change on dry ink resistance |
| Ink E | A    | Around 25 Ω      | After folding increase to around 30 | With water no change on dry ink resistance |
|       | B    | Around 25 Ω      | After folding increase to around 30 | With water no change on dry ink resistance |
| Ink F | A    | Around 25 Ω      | After folding increase to around 30 | Water damages the dry ink films, ink film broken |
|       | B    | Around 25 Ω      | After folding increase to around 30 | Water damages the dry ink films, ink film broken |
| Ink G | A    | Around 25 Ω      | After folding increase to around 30 | Water doesn't affect much on ink film |
|       | B    | Around 25 Ω      | After folding increase to around 30 | Water doesn't affect much on ink film |

FIG. 5

| Battery type | Initial conversion rate | Shelf life time | Initial electric capacity at 1200mV cut-off | Initial electric capacity at 900 mV cut-off | Long term electric capacity at 900 mV cut-off | Internal resistance |
|---|---|---|---|---|---|---|
| Battery of invention according to Figure 2 | 35% | 130% | 100% | 102% | 135% | 82% |
| Battery of invention according to Figure 3 | >36% | >130% | >110% | 106% | N/A | 75% |
| Prior art battery of figure 1 | 30% | 100% (1,5 years) | N/A | 100% | 100% | 100% |

FIG. 6

BATTERY AND A METHOD OF MANUFACTURING A BATTERY

PRIOR APPLICATIONS

This is a US national phase patent application that claims priority from PCT/FI2009/000082 filed 4 Sep. 2009, that claims priority from Finnish Patent Application Nos. 20085840, filed 8 Sep. 2008 and 20085838, filed 8 Sep. 2008.

TECHNICAL FIELD

The invention is concerned with a printed battery comprising cathode and anode electrodes with terminals to connect to an external circuit, separator there between, and electrolyte, as well as a method for manufacturing such a battery.

BACKGROUND

The basic components of a battery are the electrodes with terminals (electric connections) to connect to an external circuit, a separator to keep the electrodes apart and prevent them from shorting, the electrolyte which carries the charged ions resulting from the chemical reactions taking place at the electrodes and a cover to contain the active chemicals and hold the electrodes in place.

"Wet" cells refer to galvanic cells where the electrolyte is in liquid form and is allowed to flow freely within the cell casing. "Dry" cells are cells that use a solid or powdery electrolyte. Cells with liquid electrolyte can be classified as "dry" if the electrolyte is immobilized by some mechanism, such as by gelling it or by holding it in place with an absorbent substance such as paper.

The most common type of battery used today is the "dry cell" battery used in e.g. relatively large batteries such as "flashlight" batteries and in miniaturized versions used for wristwatches or calculators.

Batteries are often classified by the type of electrolyte used in their construction. There are three common classifications; acid, mildly acid, and alkaline.

All batteries utilize similar procedures to create electricity; however, variations in materials and construction have produced different types of batteries.

One battery type consists of a layered structure, i.e. those called thin film batteries.

Thin film batteries, which term in this text is to be understood as "layered-structured batteries" regardless of size, can be applied directly onto film applications in any shape or size. Flexible thin batteries can be made by printing on to paper, plastics, or other kind of thin foil and they are also called printed batteries.

Thin film batteries have e.g. a wide range of uses as power sources for consumer products and for micro-sized applications. Thin film batteries are also suitable for powering smart cards and Radio Frequency IDentification (RFID) tags.

The method of manufacturing such a thin battery can be done by wetting the separator paper with an electrolyte solution and applying an anode material and a cathode material as pastes on the separator paper(s), the anode paste on one side and the cathode paste on the opposite side. The anode and cathode materials can be applied on the separator papers with different methods such as by coating or printing. The coating and printing processes generally involve the application of a thin film of functional material to a substrate, such as roll of paper, fabric, film or other textile.

With the term paste, it is in this text just meant, a viscous water-based dispersion of particles.

However, also the outmost separator layers will always contain electrolyte, since they absorb electrolyte from the wetted layer and furthermore, the electrolyte solution, that contains additives, might also be mixed with the anode active material and cathode active materials to form so called anode and cathode pastes.

The electrodes of a thin battery are formed of the anode and the cathode. The anode material is a paste or ink containing an anode active material and usually electrolyte solution with additives and the cathode material is a paste or ink containing a cathode active material and usually electrolyte solution with additives. The paste is quite viscous so that the electrolyte is not capable of flowing out. The anode active material is often zinc (Zn) and the cathode active material is manganese dioxide ($MnO_2$). The electrolyte solution can e.g. contain $ZnCl_2$ as a main ingredient as well as additives, such as binder(s). The additive(s) in the electrolyte comprises binder(s) in order to provide other properties to the electrolyte solution for example binding the electrode material particles together to form a paste. The binder is e.g. polyvinylalcohol (PVA).

Conductive material is added to the anode and cathode pastes. The conductive material can be carbon powder, such as graphite powder, soot, carbon black, carbon nanotube, conductive ink or combinations thereof. The electrodes (consisting of the anode and cathode pastes inclusive the conductive material) are connected to a collector material and the whole product is covered by films of sealing material. The sealing material can be of e.g. polypropylene, polyethylene, polyester or other known film materials. The collector material is formed to have terminals to be connected to an external circuit. The collector material can be conductive carbon ink, carbon film or other material, which is chemically inert but conductive enough for the purpose.

The combined layers are cut in desired sizes to form a product.

Different formats of anode materials have been tested to facilitate the manufacturing of a thin battery.

US patent application 2006/0216586 is presented as prior art. It discloses a thin electrochemical cell. The anode of the cell can be a zinc strip. The problem with this solution is, however, that the connection of the zinc strip to the collector is problematic and that the zinc self discharge is high because of lacking coverage.

U.S. Pat. No. 6,379,835 is concerned with a thin film battery. The anode is hydrophilic being a water based zinc ink or a zinc ink in an organic solvent+water swellable polymer mixture and therefore the battery has high self discharge rate. Furthermore because of the low conductivity of anode, an extra collector at the anode is needed.

US patent application 2006/0115717 presents a flexible thin printed battery. A conductive aqueous zinc material to constitute the anode is printed directly onto a non-conductive substrate and is made sufficiently conductive to eliminate the need for a distinct anode current collector. The necessary conductivity is achieved by excess zinc+2 cations (from zinc acetate) and polymeric binder (polyvinylpyrrolidone) to improve particle contact. However, also here, Hydrophilic zinc anode causes high zinc self discharge and unstable conductivity during the discharging process.

Further prior art solutions are presented in e.g. WO publication 03/100893 and US006045942.

In addition to the self discharge problem the prior art thin batteries are complicated to manufacture or integrate into application as one of the terminals to be added have to be put on one side and the other one on the other side of the battery. As the terminals are located on the two opposite sides of the thin battery, also the integration with application is complicated. It is difficult to connect the negative and positive electrodes of a device consuming the power to the thin battery as most devices have the electrodes only on one side.

Intensive work is currently done for making constantly improved batteries by solving some of the acknowledged problems in connection with the manufacturing of the batteries and in order to decrease the self discharge.

Another problem in traditional manufacturing methods to overcome is that the paper sheets become quite wet when they are impregnated with the electrolyte and also the paste remains wet after it is applied. This situation influences on the surface properties of the layers so that further manufacturing steps will be difficult to carry out and makes the total manufacturing process of battery difficult.

There is electrolyte in the anode and cathode pastes, too. As is well known, the zinc is quite easily oxidized under wet environment containing electrolyte salt and self-discharge is a problem. Furthermore, the printing or coating of especially the anode paste is also difficult due to the fast changes of the properties of the paste.

The object of the invention is therefore to develop a battery, wherein the above problems are avoided.

SUMMARY OF THE INVENTION

The present invention may be suitable for alternate anode active components, such as magnesium, cadmium, and copper, preferably in combination with conductive carbon ink. Preferably, the anode active material is zinc (Zn) and the cathode active material is manganese dioxide ($MnO_2$).

Water or electrolyte is needed for any electrode reaction and ionic transfer between the electrodes of a battery.

Zinc is more easily oxidized in water or an electrolyte environment than in a dry environment and in many thin and flexible batteries of prior art, the zinc anode is therefore made of an aqueous paste of zinc or of a hydrophilic material. The disadvantage of such a prior art battery is, however, that the self discharge is fast. As a consequence of the self-discharge, the lifetime of the battery becomes short and its capacity smaller.

In the invention, the anode is hydrophobic and dry, which makes it difficult for water or electrolyte to directly penetrate into the deep layer of the zinc anode. The hydrophobic layer in the dry anode of the invention works like a wall to keep the moisture level of the battery stable.

A suitable moisture level in the battery is of course important for good performance, and in the battery of the invention the water can transfer from the cathode to the surface of the anode after combination of the different layers. The oxidation reaction takes place at the surface of the anode between the anode active metal, electrolyte and water.

The invention covers two different embodiments of the battery. In the first embodiment, there is only an anode layer of carbon and zinc in addition to the layers of the separator(s), the cathode material, and the cathode side collector. In the second embodiment, there is an additional layer of carbon on the anode layer in order to improve conductivity.

Firstly, in some applications it is important to have as thin layers as possible and in some other applications the energy capacity of the battery is important. For a layer, as this as possible, the one layer version is preferred. However, when zinc particles have been consumed because of the electrode reactions, ZincOxidize (ZnO) is formed from zinc particles. This causes the sheet resistance and internal resistance to increase slightly The increased resistance levels will lead to a damaged performance. Therefore the zinc concentration in the anode can not be very high in this first embodiment in order to keep the battery performance as good as possible.

For the second type of applications the energy capacity is important. For this kind of an application the second embodiment of the invention is used. In the second embodiment an additional layer is applied on the surface of the zinc anode. This improves the conductivity of the anode and the zinc is prevented from contacting with outside materials and the zinc layer may have a higher zinc concentration than in the first embodiment of the invention i.e. in the single layer structure. This will give an enhanced energy capacity for the battery.

The anode in the thin battery of the invention is flexible, stable and mass producible and useful as a power source for many applications, where a thin flexible disposal power source is needed.

Commercially available conductive materials, such as carbon inks, and commercially available anode active materials, such as zinc powders can be used to produce the anode without extra collector in the battery. The anode electrode consists of an anode material, which is a homogenous blend of zinc powder and conductive carbon ink.

The anode material for the battery of the invention is prepared by adding zinc powder to conductive carbon ink and keeping stirring until a homogeneous mixture is obtained. The zinc powder used for this purpose can be a commercial battery grade product with certain properties such as particle size, and purity. For example, the size is less than 50 μm and the purity is over 99%. Examples of usable commercial zinc powders are e.g. Grillo-Werke Aktiengesellschaft GZN 3-0 and Xstrata EC-100.

The conductive carbon ink used can be a commercial product with certain properties. The ink to be used should possess high conductivity, high flexibility, high binding strength and high hydrophobicity. Examples of usable commercial conductive carbon ink are e.g. XZ302-1 HV and XZ302-1 MV Conductive Carbon, 26-8203 Conductive Graphite, Creative Material 116-19 Low Temperature Curing Conductive Ink, DuPont 7105 Carbon, Asahi FTU-20D3, and Acheson EB-412.

The conductive ink and the proportion of zinc and the conductive ink chosen depend on e.g. conductive carbon ink sheet resistance, conductive carbon ink flexibility, binding strength, viscosity and conductive carbon ink hydrophobic properties.

From the production point of view, the anode used in the battery of the invention has the following advantages for many applications of interest 1) It is easier to produce the anode separately since it can be done in advance and e.g. be stored on rolls after printing on separator. As each step for making the battery does not have to be made simultaneously, the manufacturing process for making the battery is less vulnerable when e.g problems occur in a certain process step. This also means that a bad quality in a product of some step does not render the whole production obsolete, only the product step in question.

2) It is easy to print the anode material of the invention in the battery manufacture;

3) The anode used in the invention reduces self discharge as it is made of hydrophobic ink and does not absorb electrolyte.

4) The first consequence of the first embodiment of the invention (having one layer less) is that the risk of delamination is lower.

5) The second consequence of the fact that no separate collector for the anode is needed in the first embodiment of the invention is that the battery becomes thinner 6) High stability due to the hydrophobic property of the ink;

7) Performance, such as flexibility and capacity, is good enough for many flexible applications.

8) Easy to make the terminals of the battery at the same side, which gives great advantage to integrate into flexible applications.

In the following the invention is further described by means of some illustrative figures and examples. The invention is, however, not restricted to the details of the following description.

DETAILED DESCRIPTION

Figure 1:
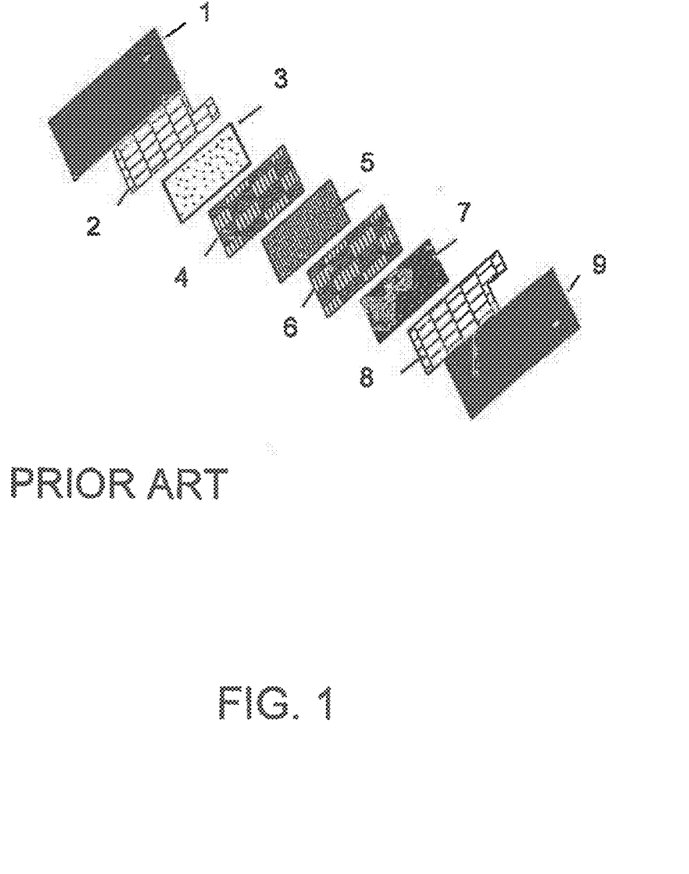
FIG. 1 is a schematic view of a battery construction of prior art with the terminals on the two faces of the battery.

FIG. 1 shows the different layers of a thin battery of prior art. The battery is presented with the layers separate of illustrative purposes. The thin battery of FIG. 1 comprises an anode material layer 3 on a separator strip 4 and a cathode material layer 7 on another separator strip 6 and an electrolyte 5 there between. Also the separators 4, 6, will contain some electrolyte. The separators 4, 6 keep the anode and cathode material layers 3, 7 apart and prevent the electrodes 3, 7 from short-circuiting.

The anode and cathode material layers 3, 7 form the anode and cathode electrodes, respectively, and they are covered by collector layers 2, 8 on both sides. The electrodes 3, 7 are connected to the terminals of the collectors 2, 8, respectively. The terminals are the extending parts of the collectors. The electrons go from the electrodes 3→anode collector 2→External Circuit→cathode collector 8→cathode paste 7. The whole product is further covered in a covering film 1, 9 (covering both sides of the battery layers) to hold the electrodes 3, 7 in place.

The battery further comprises binders, a conductive material (such as carbon powder) and other additives. Electrolyte solution with additives and conductive carbon have been mixed with the anode and cathode active materials to form an anode paste and a cathode paste, with which the separator paper layers 4, 6 are coated or printed.

The electrodes 3, 7 consisting of the anode and cathode materials are connected to the terminals of the collectors 2, 8 in order to connect the electrodes 3, 7 to an external circuit. The anode active material 3 is e.g. zinc (Zn) and the cathode active material 7 is e.g. manganese dioxide ($MnO_2$).

In FIG. 1, both the cover material 1 and 9 have one hole; they are not located on the same side of the battery. Both holes provide an electric connection to an application from the battery terminals. The hole on cover material side 1 is against the cathode side collector 8 (the cathode providing positive electricity), and the hole on cover material side 9 is against the anode collector 2 (The anode providing negative electricity) as the collectors are extending over the area of the separators.

As the anode layer 3 is not in a solid phase (it is in the form of a water paste), it can not provide an electric connection to outside. A collector is needed for the connection. When the conductive ink is used as collector, the electric connection points therefore will be on opposite sides of the battery.

Due to the fact that the terminals are located on the same side of the web, only one side of the battery will be attached to the application. In practice, there is first applied conductive material on the first hole, which is facing down; then conductive material is applied on the other hole, which is facing up. Therefore, the method of electric connection to the battery includes at least two steps.

Figure 2:
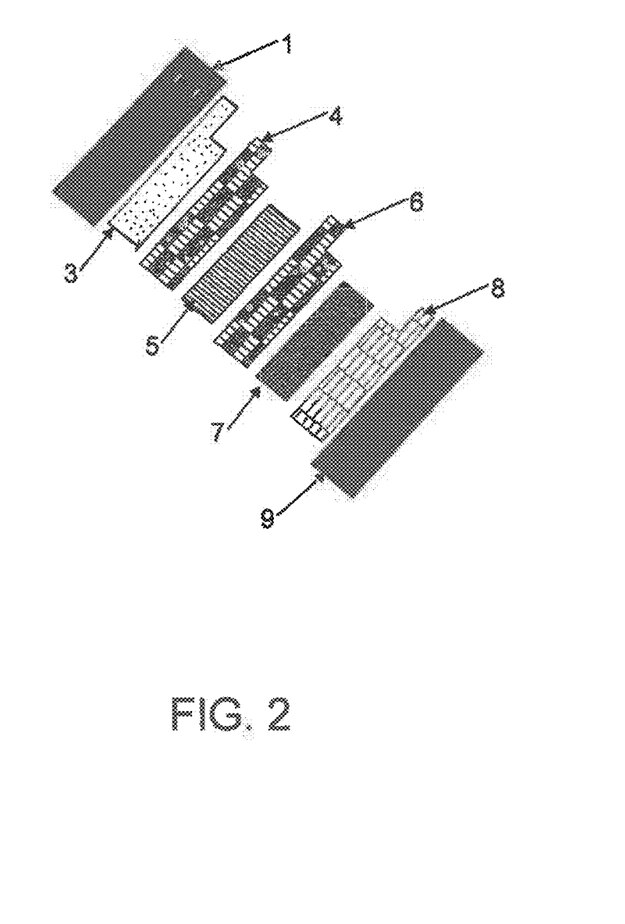
FIG. 2 is a schematic view of a battery construction according to a first embodiment of the invention, wherein the terminals connected in an advantageous way

FIG. 2 is a schematic view of a battery construction according to a first embodiment of the invention, wherein the terminals are connected in a new and advantageous way.

As in FIG. 1, FIG. 2 shows the different layers of a thin battery with the layers separate of illustrative purposes. The thin battery of the invention shown in FIG. 2 comprises an anode material layer 3 on a separator strip 4 and a cathode material layer 7 on another separator strip 6 and an electrolyte 5 there between. Also the separators 4, 6, will contain some electrolyte. The separators 4, 6 keep the anode and cathode material layers 3, 7 apart and prevent the electrodes 3, 7 from short-circuiting. The electrode 3 is printed on the separator 4. The electrode 7 is printed on either separator 6 or collector 8. (The separator strip 6 could be just a rectangle without any extending part).

In the invention, layer 3 is a combined anode and anode collector layer. The anode material layer 3 comprises zinc as anode active material and the carbon in the ink as collector material, the latter being integrated with the zinc material. This is possible because the anode material for the battery of the invention is prepared in advance by mixing the ink and zinc powder. In the manufacturing process to prepare the anode material, zinc powder is gradually added to the ink, (In the prior art solution of FIG. 1, the anode layer that was separate from the collector layer 3, was hydrophilic as it was applied as a water-soluble paste on the separator.) The cathode active material 7 is e.g. manganese dioxide ($MnO_2$).

Commercially available conductive carbon inks and commercially available zinc powders can be used to produce the anode material as described earlier more in detail. The anode material is a homogenous blend of zinc powder and conductive carbon ink.

The anode and cathode material layers 3, 7 in FIG. 2 form the electrodes and only the cathode layer 7 is covered by a separate collector layer 8. The cathode electrode 7 is in contact with the terminal of the collector 8. The electrons go from anode electrode 3→external circuit→collector 8→cathode electrode 7. The whole product is further covered in a sealing material 1, 9 (covering both sides of the battery layers) to hold the electrodes 3, 7 in place.

In FIG. 2, the terminals are on one side of the battery, which provide a possibility for a new way of electric-connection to a web application. This is possible since the separators are extending over the area of the combined anode and collector 3.

Figure 3:
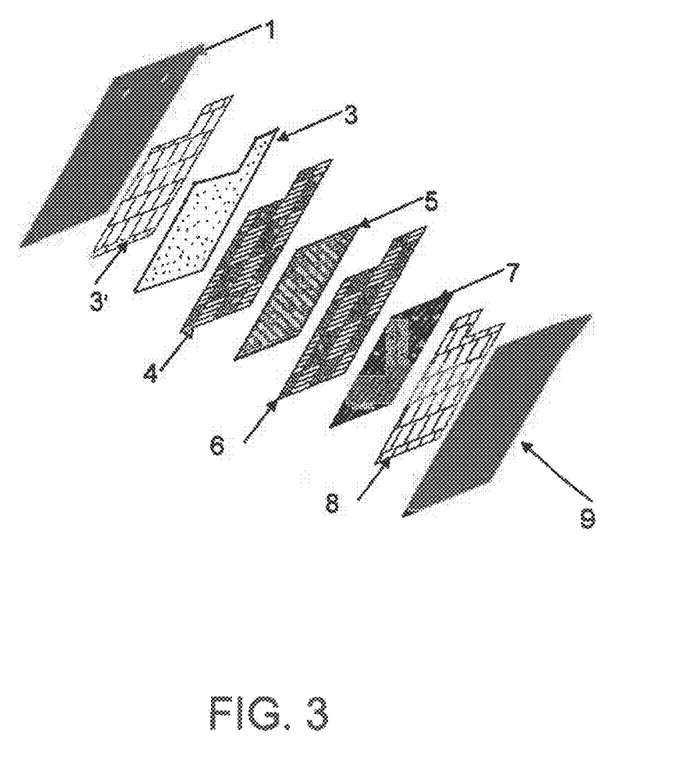
FIG. 3 is a schematic view of a battery construction according to a second embodiment of the invention, wherein the terminals connected in an advantageous way.

FIG. 3 is a schematic view of a battery construction according to a second embodiment of the invention. Also in this embodiment, the terminals are connected in a new and advantageous way.

As in FIGS. 1-2, the different layers of a thin battery are shown with the layers separate of illustrative purposes. The thin battery of the invention shown in FIG. 3 comprises an anode material layer 3 on a separator strip 4 and a cathode material layer 7 on another separator strip 6 and an electrolyte 5 there between. Now there is an additional layer 3' of conductive carbon ink in order to improve conductivity. The separators 4, 6, also containing some electrolyte, keep the anode and cathode material layers 3, 7 apart and prevent the electrodes 3, 7 from short-circuiting. The electrodes 3, 7 are printed on the separators 4, 6.

In the invention, layers 3 and 3' together constitutes a combined anode and anode collector layer. Layer 3 comprises zinc as anode active material and conductive carbon ink as collector material and layer 3' comprises conductive carbon ink. The conductive carbon ink layer 3' is integrated with the layer 3 as one complete layer as the layer 3 in FIG. 2. This 3, 3' layer is hydrophobic.

The anode 3, 3' and cathode 7 material layers in FIG. 3 form the electrodes and cathode layer 7 is covered by a separate collector layer 8. The cathode electrode 7 is connected with the terminal of the collector 8. The electrons go from anode electrode 3→conductive carbon ink layer 3'→external circuit→collector 8→cathode 7. The whole product is further covered in a sealing material 1, 9 (covering both sides of the battery layers) to hold the electrodes 3+3', 7 in place.

The layer 3' is directly applied on the top of the dry anode layer 3 and because they contain the same binder, this layer 3' is integrated (strongly bonded) with the anode layer 3. The attaching force between the collector 2 and anode 3 in FIG. 1 is not as strong as the attaching force between layers 3 and 3' in FIG. 3. (In the battery of prior art of FIG. 1, the anode 3 is applied as a paste and the collector 2, 8 is applied on cover material 1, 9.

As in FIG. 2, also in FIG. 3, the terminals are on one side of the battery, which provide a possibility for a new way of electric connection to an application. This is possible since the separators are extending over the area of the combined anode and collector 3.

A collector of a battery is a conductive layer, which transport electricity from the internal of the battery to the external of the battery. In a prior art battery of FIG. 1, a wet (weakly bonded) anode paste is applied and as it has a lower conductivity and therefore a layer of collector is needed in such a prior art battery. In the batteries of the inventions of FIG. 2-3, the anode electrode 3 and 3+3' is a layer of dry zinc carbon ink, which is a hydrophobic film. It has a higher conductivity and it is therefore easy to connect the anode to an external circuit.

In the battery of prior art of FIG. 1, collector 2, 8 (conductive ink) is printed or coated on non-conductive substrate, consisting of e.g. sealing material 1, 9 or other additional materials, and the conductive ink layers 2, 8 are facing each other. Therefore, the terminal holes have to be arranged on top and bottom of the battery. In the new structure of FIGS. 2 and 3, anode electrode 3 and cathode collector 8 are both facing upward, so that they can have terminal holes on the same face of the battery.

Figure 4:
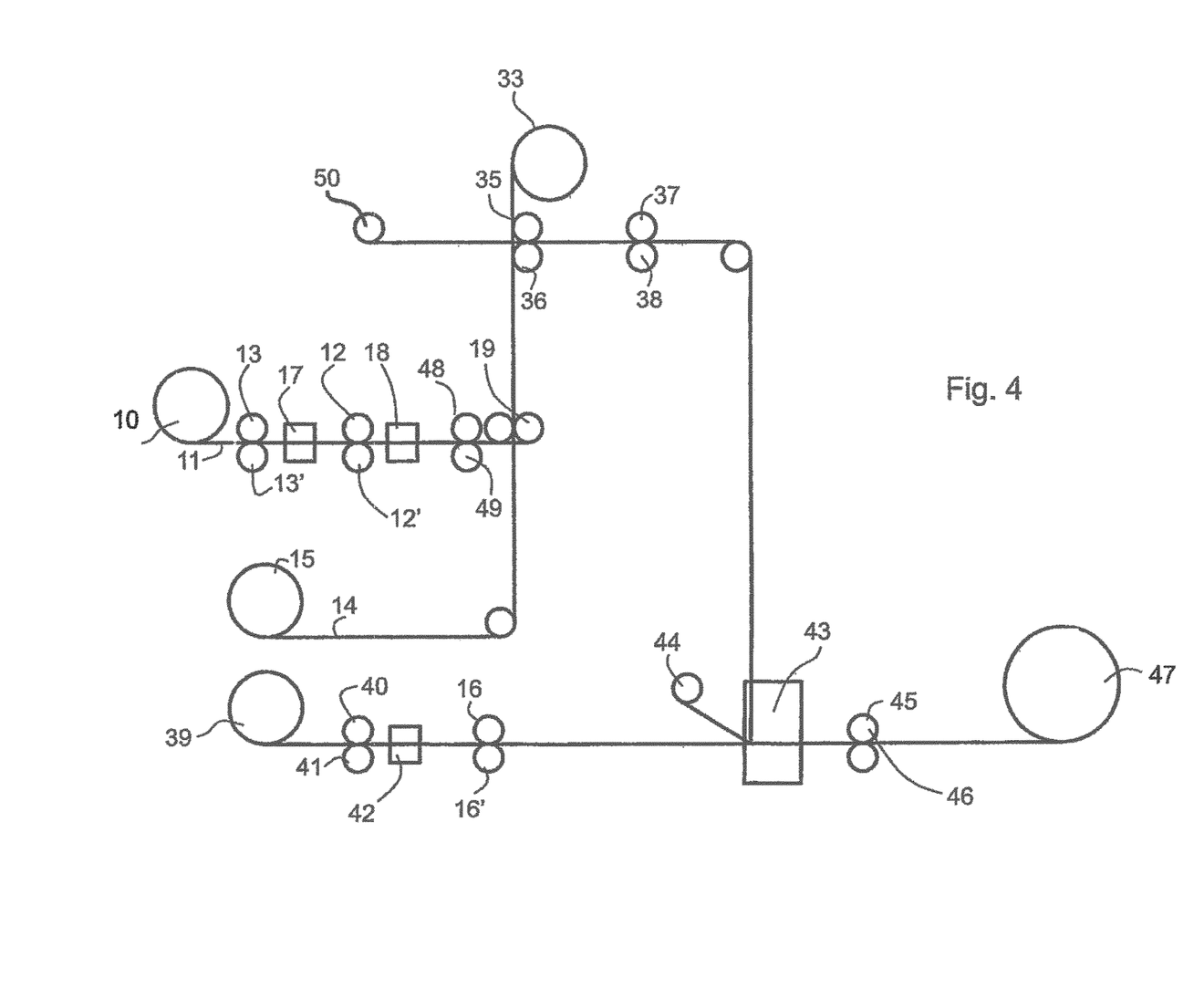
FIG. 4 is a schematic description of the main principles of a method for preparing a product of FIG. 2

FIG. 4 describes the main principles of a method to produce a thin battery of FIG. 2.

A paper web 11 to constitute the first separator paper layer is fed from an unwinding paper roll 10.

Silicon printing to facilitate separator waste collecting 44 later is performed on the web by means of printing rolls 13 and compression roll 13' followed by UV curing 17 to dry the silicon ink.

An anode material printed on separator produced in advance e.g. in the way presented in PREPARATION EXAMPLE 1 to follow below is printed in FIG. 4 by means of some printing method known in itself on a web of paper supported by a compression roll 12'. The web 11 goes through a nip formed of the compression roll 12' and another printing roll 12 on which the printed anode material is. Thereafter the web is dried 18.

An electrolyte binder solution is printed on the web by means of printing rolls 49 and compression roll 48.

Another paper web 14 to constitute the second separator paper layer is fed from another unwinding paper roll 15. This web is combined with web 11 by lamination 19.

A cover material of film is added on by means of a surface film from roll 33 by means of lamination rolls 35, 36. The cover can be a self adhesive plastic film of e.g. polypropylene or polyethylene and it can even be a metallized film. Examples are metallized polyethylene teraphthalate (MPET), polyethylene terephthalate (PET) and polypropylene (PP).

Die kiss cutting is then performed to separator anode and separator waste by means of rolls Die roll 38, and compression roll 37.

A cover (sealing) material of polypropylene or polyethylene is fed from roll 39. Collector material is printed on the cover material by means of printing rolls 40 and compression 41, where after drying is performed 42

A cathode paste containing the cathode active material (such as manganese dioxide), electrolyte and desired additives, is printed or coated by printing roll 16 and compression roll 16'.

Then this web is combined with the combined web 11, 14 by lamination 43. Separator waste collecting is performed by means of roll 44.

FIG. 4 also shows perforating rolls 45, 46 in order to perforate the product both on the cathode side and the anode side. The ready product is collected in roll 47.

The process described in FIG. 4 is an example only to show how a battery could be produced by using the anode material of the invention. The details of FIG. 4 can vary, such as e.g. the number of separators used.

Different known methods can be used in the process, e.g. screen printing, pad printing, stenciling, offset printing, and or jet printing can be uses as printing method, while the curing can be performed by heat curing, IR curing and UV curing, force hot air, and the cutting method may be e.g. die cutting, laser cutting perforating, slitting, punching or other known method.

It can easily be seen that the new kind of the combined anode and collector makes the battery much easier to produce and decreases the process steps needed.

PREPARATION EXAMPLE 1

Preparation of an Anode Material for the Battery of the Invention

The anode material for the battery of the invention is prepared by adding zinc powder to conductive carbon ink and keeping stirring until homogeneous as mentioned early. The ink and zinc powder used in the test are Acheson EB 412 and EC-100.

The conductive carbon ink is stirred with a speed of e.g. 300 rpm and the zinc powder is added gradually. When the zinc powder has been added, the speed of the mixer is gradually increased up to 2000 rpm and the blend is further stirred in about 30 minutes.

The mixing in the way it is done in the invention gives a good result of anode performance, since peeling problems, conductivity problems an uneven conductivity is avoided. A proper viscosity of the anode material is needed. If the viscosity is too low, then zinc particles will deposit to the bottom. A suitable viscosity of the ink is: Brookfield 20° C. 20 RPM 20000 mPaS to 28000 mPa·S. The mixing quality can be controlled by taking samples and checking their density or can be measured by electronic microscope.

When the anode ink is produced in this way, it can be done in advance and e.g. be stored on rolls after printing on separator. This is a real advantage for the manufacturing of the battery. As each step for making the battery does not have to be made simultaneously, the manufacturing process for making the battery is less vulnerable when e.g problems occur in a certain process step.

TEST METHODS

Some properties of the anode material can be seen as indications of the quality for the battery to be made:
- The internal resistance is a value to measure the power loss on power resources. This value should be as low as possible.
- The sheet resistance is a value to measure the conductivity of a film format material. Also this value should be as low as possible.
- The flexibility percentage is described as a percentage measured as the resistance change after being bended. The lower the flexibility percentage is, the better the flexibility of conductive ink is. A break at bending means an infinite high flexibility percentage.
- The binding strength is an indication of the material's anti-peeling property and should be as high as possible.
- The viscosity is a value to evaluate how difficult it is to stir a liquid phase. It should be in a range high enough to prevent zinc particles from depositing and low enough for printing the anode.
- The hydrophobicity indicates the availability to keep the anode dry in accordance with the idea of the invention Some principles for measuring these properties are described in the following:
Evaluation of Hydrophobicity:
The hydrophobicity was evaluated by applying water on the anode, and the hydrophobicity was considered good if the water did not dissolve, the anode did not break and/or the sheet resistance did not change
Internal Resistance Measure Method:
If $V_O$ is the open loop voltage of the battery; $V_L$ is the voltage of load, which is measured 1 minute late after discharge starts; $R_L$ is the resistance value of the load, the internal resistance is $$R_{in} = \frac{(VO - VL) \times RL}{VL}$$

Sheet Resistance Measure Method:
Sheet resistance is measured after conductive ink or anode ink is printed on a substrate and dried. The sheet resistance value is the average resistance value at 6 different positions on the sheet. Each resistance is measured by using two probes of multimeter through a distance of 1 cm.
Binding Strength
Strandard 3M pressure sensitive adhesive tape applied on dried printed surface, and applied with designated pressure by designated time.

TEST RESULT EXAMPLE 1

Anode Ink Properties

Anodes made by different proportions of zinc and conductive carbon ink were made by the method of preparation example 1.

The zinc powders used in the tests were
A: Grillo-Werke Aktiengesellschaft GZN 3-0 (Zinc content 99.8%, particle size>25 μm 14%, <25 μm 86%) and
B: Xstrata EC-100 (Zinc content 99.9%, particle size>75 μm 0.1%, <45 μm 96%).
The conductive carbon ink used were
A: XZ302-1 HV, B: XZ302-1 MV, C: 26-8203 Conductive Graphite, D: Creative Material 116-19 Low Temperature Curing Conductive Ink, E: DuPont 7105 Carbon,
F: Asahi FTU-20D3, and G: Acheson EB-412.
Some properties of these are presented in the following table:

| | Sheet resistance | Thickness | Viscosity (Pas) | Flexibility | Hydrophobicity |
|---|---|---|---|---|---|
| Ink A | Around 40 Ω | 20 μm | 55-65* | After folding resistance increases to around 65 Ω | Dry ink film not soluble, but resistance increased |
| Ink B | Around 40 Ω | 20 μm | 30-40* | After folding resistance increases to around 65 Ω | Dry ink film not soluble, but resistance increased |
| Ink C | Around 35 Ω | 20 μm | 7-8* | After folding some sample is broken, and the internal resistance increase to around 70 Ω | Dry ink film not soluble, but resistance increased |
| Ink D | Around 80 Ω | 20 μm | NA | After folding no change | With water no change on dry ink resistance |
| Ink E | Around 20 Ω | 20 μm | 15-80* | After folding no change | With water no change on dry ink resistance |
| Ink F | Around 20 Ω | 20 μm | 35-45* | After folding no change | Dry ink somehow dissolved in water |
| Ink G | Around 15 Ω | 20 μm | 12-28 | After folding no change | With water no change on dry ink resistance |

Figure 5:
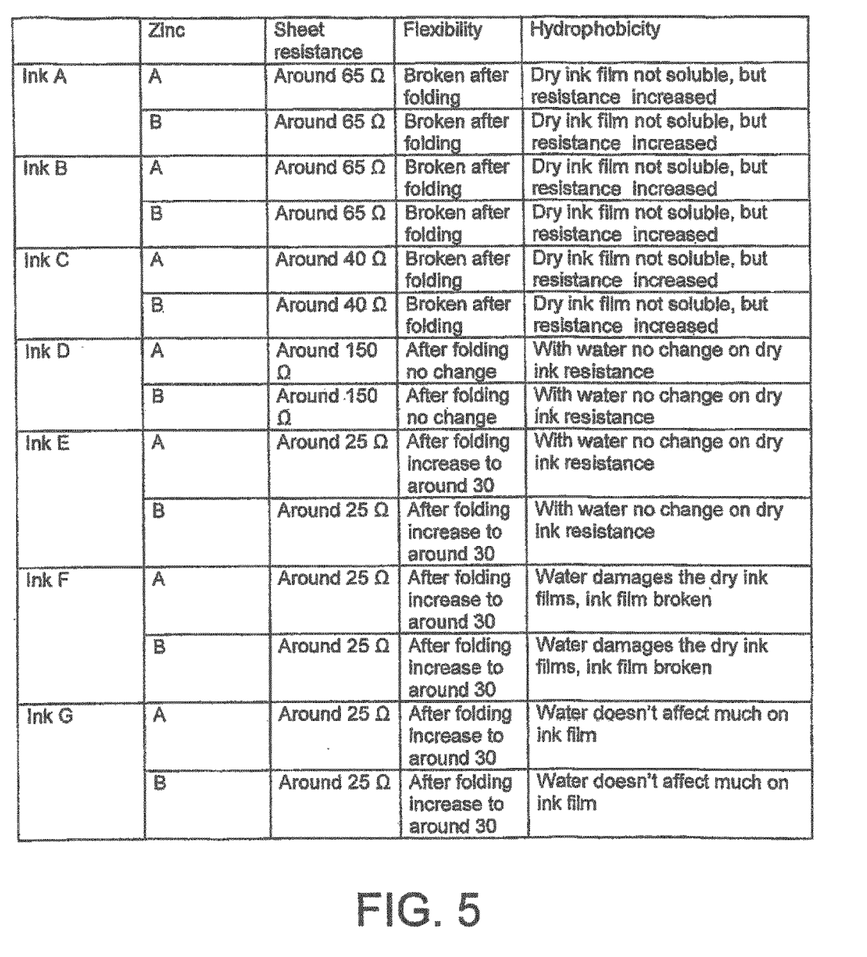
FIG. 5 presents some property test results of the anode used in the invention made with different zinc powders and conductive inks.

The proportions of the ink and the powder in the anodes tested were 1:1
Regarding the hydrophobicity of the anode ink it was tested from two aspects mentioned after having applied water on the anode.
FIG. 5 shows the test results. It shows that, for all anode inks tested, the object of the invention is fulfilled regarding hydrophobicity even for sheet resistances up to 80Ω.
Results in the table in FIG. 5 show that the advantageous properties of anode ink mainly rely on which conductive ink is used. Inks E and G have better properties and their related zinkc anode do not depend on the zinc powder used. The anode using ink G is the best with a sheet resistance of 25Ω. Ink G was used in the test below.

TEST RESULT EXAMPLE 2

Battery Properties

The inventive effect of the inventive batteries of FIGS. 2 and 3 and the prior art battery of FIG. 1 was tested. For all batteries, the composition was the same with respect to electrolyte ($ZnCl_2$), cathode active material ($MnO_2$), anode active material (Zn), separator (paper), sealing material (metallized PET and oriented PET), conductive material (carbon powder), binder (polyvinylalcohol PVA), collector (carbon ink)

The rest of the composition of the batteries of FIGS. 1-3 tested being:

| Anode | Paste anode (FIG. 1) | Dry Zinc anode 1 (FIG. 2) | Dry zinc anode 2 (FIG. 3) |
|---|---|---|---|
| EC 100 Zinc (w %) | 80% | 50% | 50% |
| Ink G (w %) | No | 50% | 50% |
| Additional layer (Ink G) | Yes | No | Yes |
| Carbon power (w %) | 2% | No | No |
| Electrolyte binder solution (w %) | 18% | No | No |

Note that the cathode paste contained manganese dioxide (w 45%), carbon powder (w 5%) and electrolyte binder solution (w 50%) and was the same in all tests. The electrolyte binder solution used in the tests contained polyvinylalcohol (w 7%), zinc chloride (7 M), and other additives. The carbon powder used in the test was Timrex MX15 from Timrex Inc. The sealing materials used there are same to all test and they are MPET and oriented PET.

Figure 6:
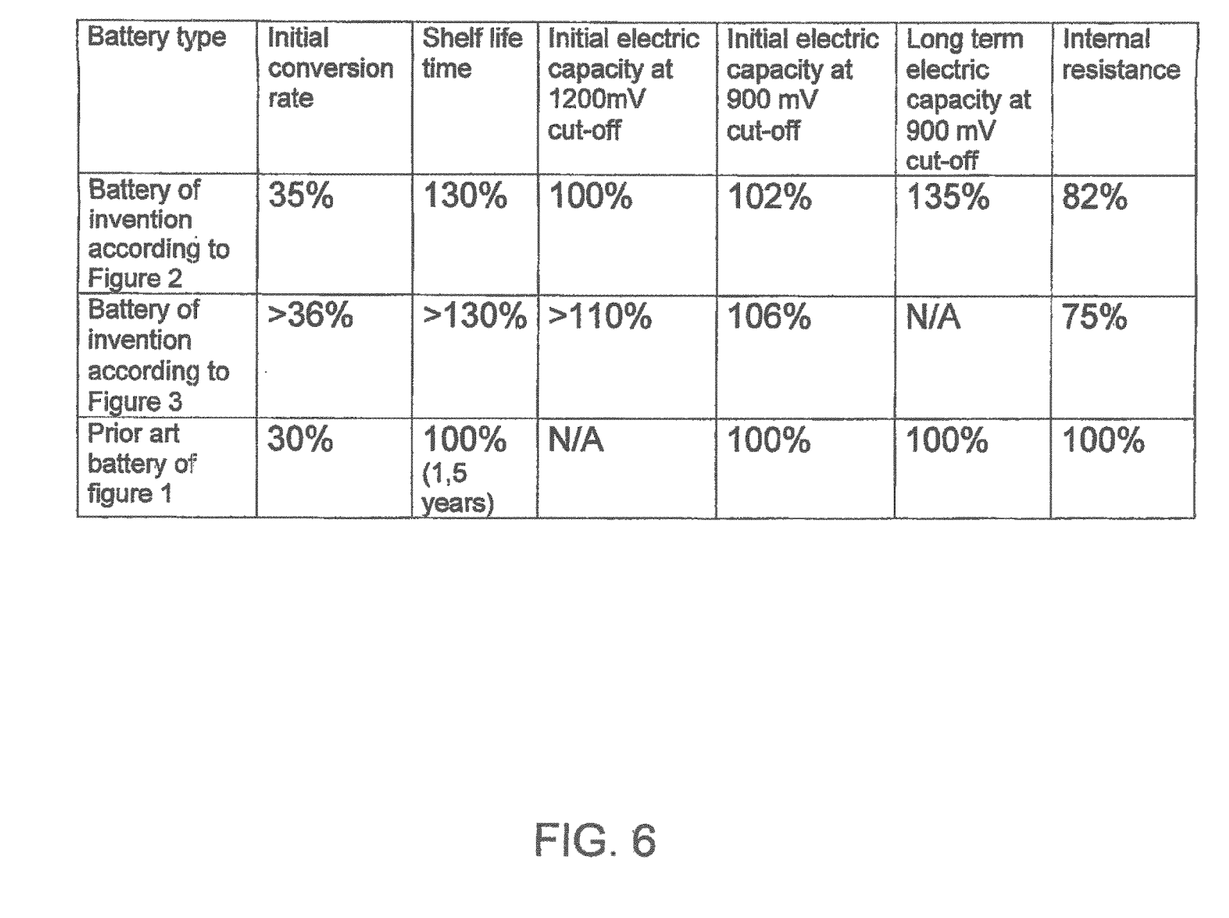
FIG. 6 presents a comparison table between the properties of the prior art battery of FIG. 1 and the batteries of the invention according to FIGS. 2 and 3.

The test results of the properties tested are presented in FIG. 6.

It can easily be seen that in all respects, the batteries of the invention has better test results than that of the battery of prior art, i.e. better capacity (the batteries of invention having values of 102% and 106% as that of prior art had 100%), better shelf life time (≥130% when that of prior art only had 100%) and better resistance value (75% and 82% for the invention batteries and 100% for the battery of prior art). The internal resistance is a value to measure the power loss on power resources. This value should be as low as possible.

While the present invention has been described in accordance with preferred compositions and embodiments, it is to be understood that certain substitutions and alterations may be made thereto without departing from the spirit and scope of the following claims.

We claim:

1. A screen printed battery, comprising:
cathode and anode electrodes with terminals to connect the screen-printed battery to an external circuit,
a first and a second separator between the cathode and the anode electrodes,
an electrolyte between the first and second separators,
an anode electrode material screen-printed on an outer side of the first separator,
a cathode electrode material applied on an outer side of the second separator,
the anode electrode material being dry and hydrophobic and functioning as an anode collector, the anode electrode material being a homogenous blend of a hydrophobic conductive carbon ink mixed with a zinc powder applied in a form of a film on the first separator.

2. The screen-printed battery of claim 1 wherein the hydrophobic conductive ink is integrated with the anode active material.

3. The screen-printed battery of claim 1 wherein the zinc powder has a purity over 99% and a particle size less than 50 µm.

4. The screen-printed battery of claim 3 wherein metal powder contains metal that is selected from zinc, nickel, magnesium, copper, iron and aluminum.

5. The screen-printed battery of claim 1 wherein the hydrophobic dry anode ink film has a thickness of 20 microns with a sheet resistance below 80Ω.

6. The screen-printed battery of claim 1 wherein the hydrophobic dry anode ink film has a thickness of 20 microns with a sheet resistance below 25Ω.

7. The screen-printed battery of claim 1 wherein the hydrophobic dry anode ink film has a thickness of 20 microns with a sheet resistance below 15Ω.

8. The screen-printed battery of claim 1 wherein the paper substrate is a separator.

9. The screen-printed battery of claim 1 wherein the battery comprises an additional layer of conductive carbon ink printed on a dry anode layer in order to improve conductivity.

10. The screen-printed battery of claim 1 wherein the terminals are on the same side of the battery.

11. The screen-printed battery of claim 1 wherein cathode electrode material is a layer of cathode active material and conductive carbon powder.

12. The screen-printed battery of claim 11 wherein the cathode active material is manganese dioxide ($MnO_2$).

* * * * *